United States Patent Office 3,116,257
Patented Dec. 31, 1963

3,116,257
SURFACTANT COMPOSITIONS CONTAINING SALTS OF VINYLSULFONANILIDES
Donald L. Klass, Barrington, Ill., assignor to The Pure Oil Company, Chicago, Ill., a corporation of Ohio
No Drawing. Filed Dec. 19, 1960, Ser. No. 76,506
9 Claims. (Cl. 252—355)

This invention relates to a new class of surfactants characterized as metallic salts of vinylsulfonamides. More particularly this invention relates to the discovery that vinylsulfonamides or sulfonanilides per se are not surface active, but their salts possess surface activity provided the organic portion of the molecule contains at least 8 carbon atoms.

In accordance with this invention I have discovered that the alkali and alkaline earth metal salts of vinyl-sulfonamides derived from olefins containing at least 8 carbon atoms have excellent surface-active properties. The vinylsulfonamides per se and the metallic salts of vinylsulfonamides derived from lower-molecular-weight olefins, i.e., having from 2 to 7 carbon atoms, do not possess this surface activity. The surfactants of this invention may be represented by the formula:

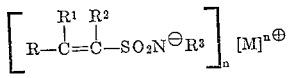

wherein R, $R^1$, $R^2$, and $R^3$ are hydrogen or hydrocarbon radicals containing from 1 to 20 carbon atoms and may be of the same or different configuration, i.e., alkyl, alkaryl, aryl, aralkyl, or cycloparaffinic radicals containing from 1 to 20 carbon atoms, the total number of carbon atoms in R, $R^1$, and $R^2$ is at least 6, or $R^3$ contains at least 6 carbon atoms or is an aryl group (e.g., phenyl), M is an alkali metal, i.e., sodium, potassium, lithium, rubidium, or cesium, or an alkaline earth metal, i.e., barium, calcium, strontium, and magnesium, and $n$ is the valence of M. The organic portion of the molecule comprises the olefinic carbon atoms along with R, $R^1$ and $R^2$, or the olefinic carbon atoms and $R^3$, to constitute a total of at least 8 carbon atoms.

The process by which the above-defined vinylsulfonamides are prepared comprises reacting about 1 mol of an olefin having at least 8 carbon atoms with about 2 mols of sulfur trioxide in complexed form, treating the reaction product with about 2 mols of a primary amine per mol of olefin reactant, reacting the resulting product with a sufficiently strong base to eliminate the amine and the sulfato group to form the vinylsulfonamide, and reacting the vinylsulfonamide with an oxide or hydroxide of an alkali or alkaline earth metal to form the surface-active salt.

It becomes then a primary object of this invention to provide surfactants of the general formula supra.

Another object of the invention is to provide a process for preparing surfactants of the general formula supra by the steps outlined above.

Another object of the invention is to provide surfactants comprising alkali metal salts of vinylsulfonamides wherein the organic portion of the molecule contains at least 8 carbon atoms.

Still another object of the invention is to provide surfactants comprising alkaline earth metal salts of vinylsulfonamides wherein the organic portion of the molecule contains at least 8 carbon atoms.

These and other objects and features of the invention will be described or become apparent as the specification proceeds.

In order to demonstrate the invention, a number of non-limiting examples are given:

Example 1

A 3.0-g. portion of the anilinium salt of 2-hydrosulfato-1-dodecanesulfonanilide, previously prepared by reacting dodecene with dioxane-sulfur trioxide complex and aniline, was dissolved in 25 ml. of 1 N sodium hydroxide solution, and the resulting solution was heated on a steam bath for 1½ hours. During this period, the viscosity of the clear solution increased appreciably. Then the mixture was cooled in an ice bath and neutralized with 10% hydrochloric acid solution, yielding 1-dodecene-1-sulfonanilide having the formula (I) 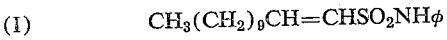

After the product had been filtered and recrystallized, it was in the form of white flakes which had a melting point of 55°–57.5° C. The product was soluble in hexane and warm oil, contained nitrogen and sulfur (qualitative elemental analysis), decolorized bromine solution in acetic acid, and consumed an equivalent of alkali when titrated, thereby indicating that it was as shown above. The infrared analysis was in accord with the structure shown.

Example 2

Example 1 was repeated, using hexene to form 1-hexene-1-sulfonanilide, having the formula (II) 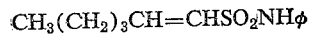

Example 3

A 45-mg. portion of product (I) of Example 1 was treated with 1.34 ml. of 0.1035 N potassium hydroxide solution to prepare the potassium salt of 1-dodecene-1-sulfonanilide, having the formula, (III) 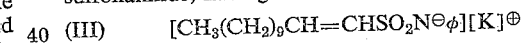

The volume of the resulting mixture was increased to 50 ml. by adding distilled water, yielding a 0.1% aqueous suspension of compound III.

Example 4

A 40.5-mg. portion of product (II) of Example 2 was treated with 1.63 ml. of 0.1035 N potassium hydroxide solution to prepare the postassium salt of 1-hexene-1-sulfonanilide, having the formula, (IV) 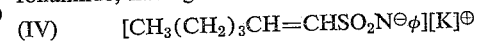

The volume of the resulting mixture was increased to 50 ml. by adding distilled water, yielding a 0.1% aqueous solution of (IV).

Example 5

The procedure of Examples 3 and 4 were repeated, using sodium hydroxide in place of potassium hydroxide, to obtain clear 0.1% aqueous solutions of the following products:

(V) 

(VI) 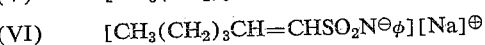

The 0.1% solutions of compounds (I), (II), (III), (IV) were shaken 25 times in a 250 ml. Erlenmeyer flask to determine the amounts of suds formed, with the following results:

| Compound | Appearance of Solution | Suds Rating at Room Temperature [1] | Time to Suds Disappearance |
|---|---|---|---|
| (I) | Turbid (insol.) | 10 | |
| (II) | do | 10 | |
| (III) | do | 10 | |
| (IIIa) (excess base) | Clear | 1 | 2 hours. |
| (IV) | do | 9 | |
| (V) | do | 1 | 2 hours. |
| (VI) | do | 9 | 10 minutes. |

[1] The suds-forming properties were rated according to an arbitrary scale wherein a rating of 1 was assigned when the 250 ml. Erlenmeyer flask was filled with suds, and a rating of 10 was assigned when no suds formed. Thus, a rating of 3 indicates that 70% of the flask was filled with suds, a rating of 4 indicates that 60% of the flask was filled, etc.

*Example 6*

One mol of undecene-1 is reacted with 2 mols of sulfurtrioxide-dioxane complex at 0° C. in a solution of 200 ml. of ethylene dichloride with stirring over a period of about 1 hour. The resulting light yellow mixture is maintained at −15° C. for two days, after which it is warmed to 10° C. and 186 g. (2 moles) of aniline in 200 ml. of ethylene dichloride are added. The resulting solution is maintained at −15° C. for two days, during which time a compound of the formula,

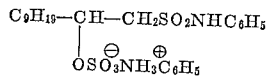

is precipitated, namely, the anilinium salt of 2-hydrosulfato-1-undecanesulfonanilide. The precipitate is filtered by use of a vacuum and air-dried. The product is dissolved in excess of 1 N sodium hydroxide solution and heated on a steam bath for 2 hours. An increase in viscosity of the solution occurs. The mixture is cooled on an ice bath and neutralized with 10% hydrochloric acid, yielding 1-undecane-1-sulfonanilide of the formula

A 45-mg. portion of this product is treated with 1.46 ml. of 0.1 N sodium hydroxide to prepare the sodium salt of 1-undecene-1-sulfonanilide:

By following the foregoing examples, the various salts of this invention may be formed, such as:

Sodium salt of 1-dodecene-1-sulfonanilide
Potassium salt of 1-dodecene-1-sulfonanilide
Cesium salt of 1-dodecene-1-sulfonanilide
Lithium salt of 1-dodecene-1-sulfonanilide
Calcium salt of 1-dodecene-1-sulfonanilide
Barium salt of 1-dodecene-1-sulfonanilide
Strontium salt of 1-dodecene-1-sulfonanilide Sodium salt of 1-octene-1-sulfonanilide
Potassium salt of 1-octene-1-sulfonanilide
Cesium salt of 1-octene-1-sulfonanilide
Lithium salt of 1-octene-1-sulfonanilide
Barium salt of 1-octene-1-sulfonanilide
Calcium salt of 1-octene-1-sulfonanilide
Strontium salt of 1-octene-1-sulfonanilide
Magnesium salt of 1-octene-1-sulfonanilide Sodium salt of 1-nonene-1-sulfonanilide
Potassium salt of 1-nonene-1-sulfonanilide
Cesium salt of 1-nonene-1-sulfonanilide
Lithium salt of 1-nonene-1-sulfonanilide
Barium salt of 1-nonene-1-sulfonanilide
Calcium salt of 1-nonene-1-sulfonanilide
Strontium salt of 1-nonene-1-sulfonanilide
Magnesium salt of 1-nonene-1-sulfonanilide Sodium salt of 1-tridecene-1-sulfonanilide
Potassium salt of 1-tridecene-1-sulfonanilide
Cesium salt of 1-tridecene-1-sulfonanilide
Lithium salt of 1-tridecene-1-sulfonanilide
Barium salt of 1-tridecene-1-sulfonanilide
Calcium salt of 1-tridecene-1-sulfonanilide
Strontium salt of 1-tridecene-1-sulfonanilide
Magnesium salt of 1-tridecene-1-sulfonanilide Sodium salt of 1-tetradecene-1-sulfonanilide
Potassium salt of 1-tetradecene-1-sulfonanilide
Cesium salt of 1-tetradecene-1-sulfonanilide
Lithium salt of 1-tetradecene-1-sulfonanilide
Barium salt of 1-tetradecene-1-sulfonanilide
Calcium salt of 1-tetradecene-1-sulfonanilide
Strontium salt of 1-tetradecene-1-sulfonanilide
Magnesium salt of 1-tetradecene-1-sulfonanilide Sodium salt of 1-pentadecene-1-sulfonanilide
Potassium salt of 1-pentadecene-1-sulfonanilide
Cesium salt of 1-pentadecene-1-sulfonanilide
Lithium salt of 1-pentadecene-1-sulfonanilide
Barium salt of 1-pentadecene-1-sulfonanilide
Calcium salt of 1-pentadecene-1-sulfonanilide
Strontium salt of 1-pentadecene-1-sulfonanilide
Magnesium salt of 1-pentadecene-1-sulfonanilide Sodium salt of 1-octene-1-N-methyl sulfonamide
Potassium salt of 1-octene-1-N-ethyl sulfonamide
Cesium salt of 1-octene-1-N-propylsulfonamide
Lithium salt of 1-octene-1-N-isopropylsulfonamide
Barium salt of 1-octene-1-N-butylsulfonamide
Calcium salt of 1-octene-1-N-t-butylsulfonamide
Strontium salt of 1-octene-1-N-amylsulfonamide
Magnesium salt of 1-octene-1-N-amylsulfonamide Sodium salt of 1-nonene-1-N-benzylsulfonamide
Potassium salt of 1-nonene-1-N-naphthylsulfonamide
Cesium salt of 1-nonene-1-N-anthrylsulfonamide
Lithium salt of 1-nonene-1-N-cyclohexylsulfonamide
Barium salt of 1-nonene-1-N-cyclopentylsulfonamide
Calcium salt of 1-nonene-1-N-phenylethylsulfonamide
Strontium salt of 1-nonene-1-N-phenylbutylsulfonamide
Magnesium salt of 1-nonene-1-N-phenylbutylsulfonamide
Sodium salt of 1-dodecene-1-N-pentylsulfonamide
Potassium salt of 1-undecene-1-N-eicosylsulfonamide
Cesium salt of 1-undecene-1-N-nonadecylsulfonamide
Lithium salt of 1-undecene-1-N octadecylsulfonamide
Barium salt of 1-undecene-1-N-heptadecylsulfonamide
Calcium salt of 1-undecene-1-N-dodecylsulfonamide
Calcium salt of 1-undecene-1-N-anthrylsulfonamide
Calcium salt of 1-undecene-1-N-benzohydrylsulfonamide Sodium salt of 1-tetradecene-1-N-cyclobutylsulfonamide
Potassium salt of 1-tetradecene-1-N-durylsulfonamide
Cesium salt of 1-tetradecene-1-N-naphthylsulfonamide
Lithium salt of 1-tetradecene-1-N-phenethylsulfonamide
Barium salt of 1-tetradecene-1-N-phenethylsulfonamide
Calcium salt of 1-tetradecene-1-N-phenethyl-sulfonamide The olefinic starting material for the reaction of this invention may be any compound containing an olefinic double bond. The only limitation attaching to the olefinic compound used is that there is no substituent groups present or attached to R, $R^1$ and $R^3$ of the general formula which are reactable with the sulfur trioxide complex used under the conditions of the reaction necessary to cause reaction at the double bond. The various sulfur trioxide complexes that may be used in this reaction have differing reactivities and some require elevated temperatures. Under some conditions, the intermediates may decompose faster than the hydrosulfate-compound can form, in which event lower yields result. Where $R^1$ and $R^2$ are hydrogen, saturated, alkyl radicals, or cycloaliphatic radicals, no difficulty is experienced due to sulfonation on the substituent group. Where $R^1$ and $R^2$ are aryl, alkaryl, heterocyclic, or other slightly reactive groups that may sulfonate across a double bond therein, the reaction of this invention will still take place but certain precautions are necessary to prevent sulfonation of these substituents. This is easily overcome by the choice of sulfur trioxide complex and the reaction temperature or reaction time. The only disadvantage attaching to the use of starting materials having somewhat reactive substituent groups (R, R¹ or R²) is that lower temperatures may be necessary and the reaction time is extended.

Accordingly, the starting olefinic materials include the simple terminal olefins (R¹ and R² being hydrogen) such as octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, docosene-1, tricosene-1, tetracosene-1, and pentacosene-1. Higher-molecular-weight terminal olefins, or mixtures containing higher-molecular-weight terminal olefins from refinery streams, alkylate streams, isomerization processes etc. may also be used.

Where R¹ or R² or both are alkyl groups, each may contain from 1 to 20 carbon atoms including methyl, ethyl, propyl, butyl, pentyl, hexyl, heptyl, octyl, nonyl, decyl, undecyl, dodecyl, tridecyl, tetradecyl pentadecyl, hexadecyl, octadecyl, nonadecyl, and eicosyl as members of the straight-chain alkyl series; or isopropyl, isobutyl, t-butyl, isohexyl, isooctyl, etc., as members of the branched-chain alkyl series. Such internal olefins as 2-methylnonene-1, 1,2-dimethyl octene-1, 2-ethyl-1-methyl-heptene-1, 2-methyl-1-ethyl heptene-1, 2,2-diethyl-hexene-1, 2-ethyl-1-propylpentene-1, 2-propyl-t-ethylpentene-1, 1,2-dipropylbutene-1, 1,2-diisopropylbutene-1, 1,2-dibutyl propylene, 1-propyl-2-butyl propylene, 1,2-dimethylhexene-1, 2-methyl-heptene-1, 2-ethyl-1-methylhexene-1, 1,2-di-t-butyl propylene, 1-isopropyl-2-isobutyl propylene, and the like are members containing at least 8 carbon atoms. Higher-molecular-weight olefins constituting a preferred group are 1,2-diethyloctene-1, 1,2-dipropyloctene-1, 1,2-dibutyloctene-1, 1,2-diisobutyloctene-1, 1,2-di-t-butyloctene-1, 1-butyl-2-propyl-nonene-1, 1-hexyl-2-heptyl-octene-1, 1-octyl-2-nonyl-octene-1, and 1-eicosyl-2-methyl-octene-1.

Members of the group of olefinic starting materials containing other substituent groups, i.e., aryl, alkaryl, cycloparaffinic and aralkyl radicals, include acenaphthenyl, anthryl, benzohydryl, benzyl, biphenylyl, bornyl, camphanyl, carbacryl, cuminyl, cumyl, cyclohexyl, cyclopropyl, cyclobutyl, cyclopentyl, cymyl, duryl, fenchanyl, fluoroenl, indanyl, l-mesityl, 2-mesityl, phenanthryl, phenethyl, tolyl, and xylyl groups are phenylethylene, 1,1-diphenylethylene, triphenylethylene, sym. diphenylethylene, diphenylethylethylene, diphenylbutylethylene, diphenylisopropylethylene, diphenylcyclohexylethylene, phenylcyclopentylethylene, naphthyl dimethylethylene, 2-butyl-3-phenyl pentene-1, 2,3-diphenyl pentene-1, 2-benzyl-octene-1, 2,3-dinaphthyl pentene-1 benzyl dimethylethylene, 3-furylpentene-1, 4-anthryl-butene-1, dianthrylmethylene, 2-cyclohexyl-3-furylpentene-2.

The amine used in the reaction is selected from the group of primary amines of the formula $$R^3NH_2$$

wherein R³ is a hydrocarbon radical having from 1 to 20 carbon atoms and may be alkyl, aryl, alkaryl, aralkyl, or cycloparaffinic in structure. Species of amines include methylamine, ethylamine, propylamine, isopropylamine, butylamine, amyl or pentylamine, t-butylamine, isopentylamine, hexylamine, isohexylamine, heptylamine, octylamine, nonylamine, decylamine, dodecylamine, undecylamine, tridecylamine, tetradecylamine, pentadecylamine, hexadecylamine, eicosylamine, heptadecylamine, nonadecylamine as members of the aliphatic series; cyclopropylamine, cyclobutylamine, cyclopentylamine, cyclohexylamine, cycloheptylamine as members of the cycloparaffinic series; and benzylamine, decahydronaphthylamine, aniline, laurylamine, oleylamine, eicosenylamine, furfurylamine, 4-ethoxycyclohexylamine, and the like.

Oxides and hydroxides of alkali metal and alkaline earth metals are used, preferably the hydroxides of alkali metals, to transform 2-hydrosulfato alkanesulfonamides to the alkylene sulfonamide form and also to form the final salts which constitute the surfactant compounds. For these purposes sodium hydroxide, potassium hydroxide, lithium hydroxide, calcium oxide, calcium hydroxide, barium oxide, barium hydroxide, barium hydroxide octahydrate, magnesium hydroxide, manganesium oxide, strontium oxide, and strontium hydroxide may be used. The base used to form the alkylene sulfonamide may be the same or different base from that used to form the final salt. If the same base is used, the salt can be isolated directly without acidification.

Any inorganic or strong organic acid may be used in the acidification steps. The inorganic acids include hydrochloric, hydrobromic, hydroiodic, hydrofluoric, sulfuric, nitric, carbonic, phosphoric, and sulfurous acids and the like. The organic acids include acetic, propionic, benzoic, lactic, citric, oxalic, butyric, hydrocyanic, malonic, oleic, succinic, lauric, trichloroacetic, and valeric acids. Any acid capable of producing hydrogen ions may be used for these steps of the reaction.

The reaction is carried out by merely bringing together the olefinic reactant with the sulfur trioxide complex at temperatures best suited for the particular complex employed. In general, sulfur trioxide complexes react at temperatures between −10° to 120° C. A number of sulfur trioxide complexes are available for the reaction. Dioxane-sulfur trioxide, trimethylamine-sulfur trioxide, pyridine-sulfur trioxide, triethylamine-sulfur trioxide, dimethyl-formamide-sulfur trioxide, dioxane bis-sulfur trioxide, thioxane-sulfur trioxide, thioxane bis-sulfur trioxide and dimethylaniline-sulfur trioxide complexes may be used. There is a threshold temperature at which each complex becomes reactive. Consequently, the most suitable temperature range for the reaction will depend somewhat on the complexing agent used. The most suitable temperature range between −10° to 120° C. may be found by trial experiments. In general, the reactivities of the complexes is known in the art, and as in the case of pyridine-sulfur trioxide, a temperature between about 90° to 120° C. is suitable. It may be found that the intermediates decompose faster than they are formed, in which event lower temperatures and longer contact times will be necessary.

The reaction time may be from five minutes to one day and no pressure is required. Since the complexes are solids, they are used in solution or slurry form with an inert solvent. Suitable solvents include ethylene dichloride, ethylene trichloride, various organic esters such as ethyl acetate, butyl acetate, propyl acetate, unreactive naphthas or mineral oils, mineral spirits, VM&P naphtha, Stoddard solvent, and cyclohexane. With dioxane-sulfur trioxide as the reactant complexing agent, one expedient is to use an excess over the stipulated 1 molar quantity whereby the excess acts as a solvent for the reaction. Other of the complexing agents may be used in this manner. Agitation is applied to the reaction in a known manner or may be omitted, although its use shortens the reaction time.

A color change will be observed generally as an indication of the completion of the first stage of the reaction. Various other expedients, such as detection of unreacted olefin, or complex, may be used to follow the reaction and determine when equilibrium has been reached.

The addition of the reactant nitrogen compound in the second step of the reaction is conducted gradually with continued agitation. This stage of the reaction is easily followed since the beta-sulfato products are solids and precipitate from the reaction mixture. Various known methods of separating the solid product may be used. Filtration under vacuum is one expedient, and centrifuging or settling may be also used. The product may be used per se without separation and recrystallization, although for most uses it is the better practice to separate and purify the end products. The products may be recrystallized from any of the solvents mentioned herein or water may be used for this purpose. Identification is made through melting points, mixed melting points, refractive index, infrared analyses or analyses for the elements. The reaction may be conducted batchwise or on a continuous basis.

The steps of transforming the hydrosulfato-sulfonamide or hydrosulfatosulfonanilide compound to the alkylene-1-sulfonamide or alkylene-1-sulfonanilide form is carried out using a solution of a base. Generally solutions of 0.1 to 2 N are sufficient, and aqueous solutions are preferred, because emulsion difficulties are avoided and product separation is facilitated. Either concentrated or dilute aqueous solutions may be used. The temperature of this phase of the reaction is about 50° C. to 150° C. and preferably about 100° C. The cooling step following this base treatment is carried out at about −10° C. to 10° C. or the temperature of an ice bath. The neutralization step following is carried out at room temperature as is the step of forming the salt end product. Some application of heat, to the temperature of a steam bath, facilitates the final salt formation.

As one feature of the invention wherein the neutralization step is eliminated by using a base of a metal which produces the desired salt directly, the resulting sulfate salt of the base can either be removed from the product or left therein as a builder for the sulfonate product. The sulfate salt of the base can be removed by filtering, centrifuging or other means applicable to the separation of inorganic salts from organic salts. Mixed salts of the vinylsulfonamides of this invention are also contemplated wherein mixtures of bases of alkali and alkaline earth metals are used in either the neutralization step to form the mixed vinylsulfonamide directly or in the final step, after neutralization, wherein the amide product is reacted with a base salt of the metal M.

Since many apparently widely different embodiments of the invention may be made without departing materially from the spirit and scope thereof, it is to be understood that the invention is not limited to the specific embodiments thereof except as defined in the appended claims.

The embodiments of the invention in which an exclusive property or privilege is claimed are defined as follows:

1. A surfactant composition consisting essentially of an aqueous solution of a salt of a vinylsulfonamide of the formula:

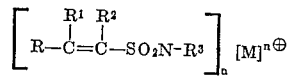

wherein R, $R^1$ and $R^2$ are substituents of the group consisting of hydrogen, alkyl of from 1 to 20 carbon atoms, phenyl, cyclopentyl, cyclohexyl, naphthyl, benzyl, furyl and anthryl, $R^3$ is a substituent of the group consisting of alkyl of 1 to 20 carbon atoms, cycloalkyl of 3 to 7 carbon atoms, benzyl, decahydronaphthyl, phenyl, allyl, eicosenyl, furfuryl and 4-ethoxycyclohexyl, the minimum total number of carbon atoms in the alkylene portion of the molecule being 8, M is a metal of the group consisting of sodium, potassium, lithium, rubidium, cesium, barium, calcium, strontium and magnesium and $n$ is the valence of M.

2. A surfactant composition in accordance with claim 1 in which R is an alkyl of from 1 to 20 carbon atoms, $R^1$ and $R^2$ are hydrogen, $R^3$ is phenyl and M is sodium.

3. A surfactant composition in accordance with claim 1 in which R is an alkyl of from 1 to 20 carbon atoms, $R^1$ and $R^2$ are hydrogen, $R^3$ is phenyl and M is potassium.

4. A surfactant composition in accordance with claim 1 consisting essentially of about 1% by weight of said vinylsulfonamide salt.

5. A surfactant composition consisting essentially of the aqueous alkaline solution of the alkali metal salt of 1-dodecene-1-sulfonanilide.

6. A surfactant composition consisting essentially of the aqueous alkaline solution of the alkaline earth metal salt of 1-dodecene-1-sulfonanilide.

7. A surfactant composition consisting essentially of the aqueous solution of the sodium salt of 1-dodecene-1-sulfonanilide.

8. A surfactant composition consisting essentially of the aqueous alkaline solution of the potassium salt of 1-dodecene-1-sulfonanilide.

9. A surfactant composition consisting essentially of the aqueous alkaline solution of the potassium salt of 1-undecene-1-sulfonanilide.

References Cited in the file of this patent

UNITED STATES PATENTS

| 2,948,753 | Kranz | Aug. 9, 1960 |
| 2,964,538 | Kundiger et al. | Dec. 13, 1960 |

FOREIGN PATENTS

| 823,970 | Germany | Dec. 6, 1951 |

OTHER REFERENCES

Bergmann: The Chemistry of Acetylene and Related Compounds, page 80 (1948).
Lambert et al.: J. Chem. Soc., pages 46–49 (1949).
Bordwell et al.: J. American Chem. Soc., volume 76, pages 3952–3956 (1954).